May 8, 1945. R. F. CLEMENS 2,375,282
PURIFICATION OF LIQUIDS
Filed Dec. 20, 1941 2 Sheets-Sheet 2

INVENTOR
Robert F. Clemens
BY
Arthur Middleton
ATTORNEY

Patented May 8, 1945

2,375,282

UNITED STATES PATENT OFFICE 2,375,282

PURIFICATION OF LIQUIDS

Robert F. Clemens, Union City, N. J., assignor to The Dorr Company, New York, N. Y., a corporation of Delaware Application December 20, 1941, Serial No. 423,849

2 Claims. (Cl. 210—3)

The present invention relates to the separation of suspended particles from the liquid medium in which they are suspended. More specifically the invention relates to the clarification or purification of impure or polluted liquids such as sewage, trade and dairy wastes, packing and cannery wastes, oil refinery wastes and the like which are characterized by the necessity of removing certain constituents thereof before the same may be either re-used or released into water-courses such as rivers and streams or into the ocean.

Such constituents may comprise any suspended particles that interfere with the clarity of the liquid in which they are suspended and include both inorganic particles and organic particles which may cause turbidity or pollution including particles which are prone to septicity. In general, such constituents exist in the waste waters in the form of suspended matter whose settleability ranges from normally readily settleable solids such as grit, up through varying degrees of difficult settleability to colloids and oil or grease particles that are normally non-settleable and which may, in fact, float on the surface of the body of waste water or other liquid.

Accordingly, the principal object of the present invention is to provide an improved method of and apparatus for promoting flotation of suspended matter that is capable of being floated and for promoting settling of suspended matter that is capable of settling, together with efficient means for removing both the floated and settled matter from the liquid in which they are contained. In carrying out the above mentioned object, the invention makes use of reduced pressure or vacuum phenomena which, acting upon the surface of and at least through a portion of the body thereof, serves to promote both the flotation and settling characteristics of the suspended material in the enveloping liquid.

Liquids of this character are well exemplified by sewage which ordinarily is treated by causing it to flow into a relatively large settling basin, often called a sedimentation tank or clarifier. The sewage is held within the basin in substantial quiescence in order that the suspended solids may settle and become deposited on the bottom of the tank or clarifier as sediment while the clarified effluent is carried off by means of an overflow weir located adjacent the top of the tank. Mechanical means are usually provided for raking the sediment from the tank bottom to a point of discharge. The size of such clarifiers is determined by the overflow rate and the detention time necessitated by the various settling rates of the suspended solids to be settled. Due to the normally slow settling rates of the solids contained in suspension in sewage, such clarifiers are, of necessity, relatively large.

Some of the suspended material in sewage is floatable and tends to rise to the surface of the liquid to form a scum which is unsightly and may give rise to disagreeable odors. The removal of such scum from clarifier tanks is in many cases not easy to accomplish. Where other industrial liquids or wastes are concerned, the suspended solids may have value and it is desirable to promote flotation of all such solids as are capable of being floated in order that the scum or surface material may be reclaimed upon removal. The present invention has among its objects the provision of an efficient means for removing floatable matter as scum at a rate commensurate with its accumulation on the surface of the liquid while at the same time promoting such flotation to as great an extent as is possible. The invention also has as another and equally important and similar object the provision of a means for removing settleable matter from polluted liquids in a rapid manner without the necessity of the usual long detention period and toward this end contemplates the promotion of rapid settling of this matter as well as promotion of flotation of the floatable solids. In accomplishing these last two objects of the invention the usual large settling basin or area may be dispensed with and a substantially smaller basin or area, together with materially smaller equipment, substituted in its stead.

In carrying out the above mentioned principal objects, the invention contemplates the provision of a means for causing the polluted liquid to have a gas diffused therein and for thereafter conducting the gassed liquid to a region in close proximity to the surface of the body of liquid being treated, while at the same time maintaining a reduced pressure on the surface of the liquid body which is less than the pressure acting on the gassed liquid. Normally the gassed liquid is supplied at substantially atmospheric pressure while the pressure on the surface of the liquid being treated is sub-atmospheric and by the maintenance of such pressures in and on the surface of the liquid, the phenomena of both settling of the suspended settleable solids and flotation of the suspended floatable solids are greatly enhanced. Moving means are provided for skimming floated matter, including scum, foam, oil or grease, into scum removal hopper including a dam over which the floating matter is impelled for removal from the zone of liquid treatment. Moving means may likewise be provided for impelling the settled solids to a zone of removal, all without losing the effect of the maintained differential air pressures by air leakage.

The invention further contemplates as an important feature thereof the provision of a means for controlling the liquid level within the tank or settling basin or at least that portion of the liquid body from which the floated material is moved to its discharge from the tank. Additionally, there is provided means whereby a major portion of the contents of the settling tank or basin will remain intact in the tank in the event that the differential air pressure or degree of vacuum maintained in the tank is dissipated due to air leakage or from any other cause whatsoever. Impotrant, too, is the provision of a means wherein treated or clarified effluent is drawn from the tank at a region functionally remote from the region of emission of the feed liquid into the tank and at a region at which the existing differential air pressure is below a critical amount. A further feature of the invention is the provision for capture of foul vapors that may arise from the liquid being treated in order that the former may be rendered innocuous.

According to the invention, various means may be provided for maintaining a constant level of liquid in that portion of the liquid-solids mixture being treated and from which floating matter is skimmed but in the preferred form thereof a balanced column of clarified liquid is segregated from the main body of liquid by means of a baffle construction and the height of liquid in the column is maintained constant by means of a weir over which clarified effluent flows, the segregated column and main body of liquid remaining in constant communication for mutual equalization of their respective liquid levels as controlled by the liquid level of the column.

The various discharge outlets from the tank for the clarified effluent, the floated material, and the settled solids are each sealed by means of a combined barometric leg and liquid trap or its equivalent to discourage or minimize leakage of influx of air at these points or regions in order that the full predetermined degree of subatmospheric pressure or vacuum may be maintained at the surface of and above the liquid while at the same time the effect of any small air leaks that may develop in the closed structure at other points may be nullified by maintenance of an adequate vacuum producing means, at least until the condition can be recognized and corrected. Provision is also made for utilizing the vacuum producing means whereby subatmospheric pressure is maintained in the tank to stabilize the barometric leg and seal for the effluent discharge and prevent surging of liquid therein. By such an arrangement the effective height of the barometric leg which seals the effluent discharge is maintained constant although variable at will and as a result a constant outgoing effluent force of drive is produced which is balanced against and is sufficient to insure the maintenance of relative uniform subatmospheric pressure conditions within the tank. This latter feature of the invention is an important one and is accomplished by the simple expedient of utilizing the vacuum producing means to withdraw liquid from the barometric leg at a level slightly below the level of liquid within the tank so that the liquid in the barometric leg cannot rise above this point. Stated otherwise, the suction applying means above referred to exists primarily for applying the effect of vacuum to the main body of liquid but is also utilized to control the height of the barometric leg and seal for the effluent discharge so that this barometric leg cannot attain a height detrimental to proper discharge of fluid.

According to the principles of the present invention, the sequential gassing and vacuum or reduced pressure treatment seems to cause not only the normally floatable matter but also a substantial quantity of normally non-floatable and normally hard-to-settle suspended solids to rise or be buoyed to the liquid surface from whence they are removed by the skimming means. Other suspended solids seem to have their settleability increased so that as a result of the vacuum treatment, solids from some liquids settle to the bottom of the tank and deposit as sediment whereupon they are independently removed. When treating some liquids, the clarified liquid may be removed from the tank through the vacuum suction pipe, while in treating other liquids, it may be desirable to remove the treated liquid from another zone or zones of the tank.

Since it has been found that the vacuum is effective to the maximum to float suspended solids substantially only when they are exposed to the vacuum effects at the liquid surface, it is important that the velocity of the suspended solids fed to the machine shall be such that solids reach the region of the liquid to be treated. They are preferably supplied to the tank by means of a draft tube that is so calibrated and so shaped that the suspended solids in the feed passing up through the draft tube are emitted therefrom into that zone in which the vacuum becomes effective on them. The design and shape of the draft tube should be such as to give a velocity of the feed liquid up the draft tube sufficient at least to prevent settling of solids within the moving liquid. Once the solids or any portion of them obtain a downward motion through the upflowing liquid, the pull of the vacuum is materially reduced and such back-slip, once it is started, may thus become accelerated. At the same time, however, the velocity of the liquid emitted from the mouth of the draft tube should not be great enough to cause substantial up-surge or turbulence in the liquid thereabove. The reason for this is that it causes the bubbles buoying up the floated solids to be shaken loose therefrom, whereupon those solids descend and thus escape being skimmed off the liquid level as scum. Experience has shown that the mouth of the draft tube can be located conveniently about fifteen inches below the liquid level although it can be used varyingly in a range substantially between two and fifteen inches. Experience has also shown that the degree of vacuum used is important. Below five inches of mercury, there is little effectiveness. Indeed, not less than seven inches of mercury seems to be about the minimum degree of vacuum used, and nine inches or higher is best and this latter figure is therefore recommended. It takes 13.6 inches of water to equal one inch of mercury and therefore in order to have at least some degree of vacuum effective on all the liquid in the tank, except of course that on the bottom thereof, the tank should be of the order of 9 x 13.6 inches in depth, or roughly 10 feet. In such a tank, while there is vacuum equal to about nine inches of mercury effective on the liquid level in the tank, at one foot below the liquid level, the vacuum equals about 8 inches of mercury, and so on down, each foot of depth taking off about one mercury-inch of effectiveness of the vacuum. Beyond five feet (or five mercury inches), however, there seems to be little vacuum effect. This, however, is desirable for it leaves that zone of liquid below the five foot level in relative quiescence and these solids which are of high specific gravity are permitted, unmolestedly, to settle and form a sediment on the bottom of the tank from whence they may readily be removed at will. The region of withdrawal of this sediment is preferably under the effect of vacuum equal to or less than five inches of mercury, thus assuring that no floatable material will be carried off with the sediment. Discharge of materials from such an apparatus naturally has to be through the medium of a liquid-sealed barometric or hydrostatic leg or its equivalent, for otherwise the effect of subatmospheric pressure would be lost by air-leakage through the discharge regions.

The flotation effects attained by this vacuum treatment on suspended solids take place within a rather limited range of degrees of vacuum, so as much as possible of the floatable material must assuredly be conveyed into that horizontal layer of liquid subject to such vacuum. This is assisted to some extent by first diffusing dissolving air or gas in the liquid fed to the vacuum tank whereby when the suspended particles encounter the lessened pressure in the tank, the dissolved and entrained gas is released to form gas bubbles that attach themselves to solid particles and tend to float most of the suspended material into that area of limited vacuum effect. Aeration or gassing of the liquid prior to its release into body of liquid being treated under the effect of vacuum, has proven to be quite satisfactory since it effects the diffusing of the air or gas in the liquid, but in such a case, it is usually desirable to give the aerated liquid some de-aerating treatment prior to its release in the liquid body in order to remove from it substantially all large or coalesced bubbles. Rising bubbles enlarge in ascending, and an expanding bubble tends to detach itself from the solid that is buoying up or floating. Therefore, the finer or smaller the bubbles developing from the liquid under vacuum the better, for merely large entrained air bubbles are useless for the flotation function. In fact the large bubbles are detrimental because they cause undue agitation on being released.

Non-settleable and slow settling suspended solids interfere with the settling of readily settleable solids, but the sequential gassing and vacuum treatment of this invention seems to pull the slow settling suspended solids up and out so that the left-behind non-floatable and settleable solids can assume their normal free settling rates. Thus in a machine embodying this invention, settleable solids which do not float settle more rapidly. The vacuum and the rising force exerted by the air bubbles on the suspended solids act like a collector, especially when there are grease or other foam- or froth-forming substances present, as is especially true in sewage and the like wastes. The vacuum apparently has a de-gassing effect on some solids. For instance, it causes to settle activated sewage sludge that would tend to float due to adherence of gas bubbles to the solids. The vacuum will cause to float normally non-floatable inorganic matter of some types such as lime sludge derived from water softening, as magnesium hydroxide, borax, potash and the like.

With respect to the treatment of sewage, it is to be recalled that sewage coming to a treatment plant at times has a relatively high temperature. This, together with flat sewer grades and long flow lines, often results in considerable anaerobic bacterial action taking place in the sewage prior to clarification treatment, with the result that there are usually present in the incoming sewage substantial quantities of gas bubbles, buoyed scum, and floating, partially-digested sewage sludge. The discharge of large quantities of cannery wastes into sewerage systems aggravates this problem and increases the floating scum. The apparatus of this invention is quite effective on these conditions, for not only are the scum and the sludge separated, but the sewage being treated in the machine is de-gassed.

The presence of finely-divided gas bubbles in sewage or other liquid has a decidedly detrimental effect on clarification by sedimentation; so to rid the sewage of its entrained gas, substantially facilitates the subsequent sedimentation. And again, as sewage and the like wastes are usually highly odorous, the vacuum removal of this invention rids the liquid of its entrained gases and thereby reduces their odor-producing content.

The trade-mark "Vacuator" has been given to and used in connection with embodiments of this invention, prior to the filing of this application, so that term for short, may be used hereinafter. A major characteristic of a Vacuator is the vacuum removal from liquids not only of normally floatable matter but also of normally non-floatable matter. A further characteristic is the simultaneous independent removal from liquids of normally non-floatable and of settleable suspended matter desired to be removed therefrom. Thus it is a machine that accomplishes removal of matter from the liquid by physical means in distinction from biologic or bio-chemical means. In some cases, the Vacuator may be used as a skimmer only, so that scum is discharged from it by one path, while by another path there is passed from the Vacuator, de-scummed liquid with non-floatable solids unremoved from suspension therein. Other uses may call for three separate discharge paths leading from the Vacuator namely (1) for scum, (2) for clarifier effluent, and (3) for sediment or sludge. The vacuator has proven that it can do a fair job of removing suspended solids at as high an overflow rate as 10,000 gallons per sq. ft. per 24 hours.

There has been chosen for illustration an embodiment of the invention which in my present view is the best, but it is not to be taken as limiting, for obviously the invention can be carried out in other embodiments and shapes and arrangements that still fall within the scope or ambit of the appended claims.

In the drawings:

Figure 3 is a fragmentary sectional view taken substantially along the line 3—3 of Figure 2.

In all of the above described views, like characters of reference are employed to designate like parts throughout.

Figure 1:
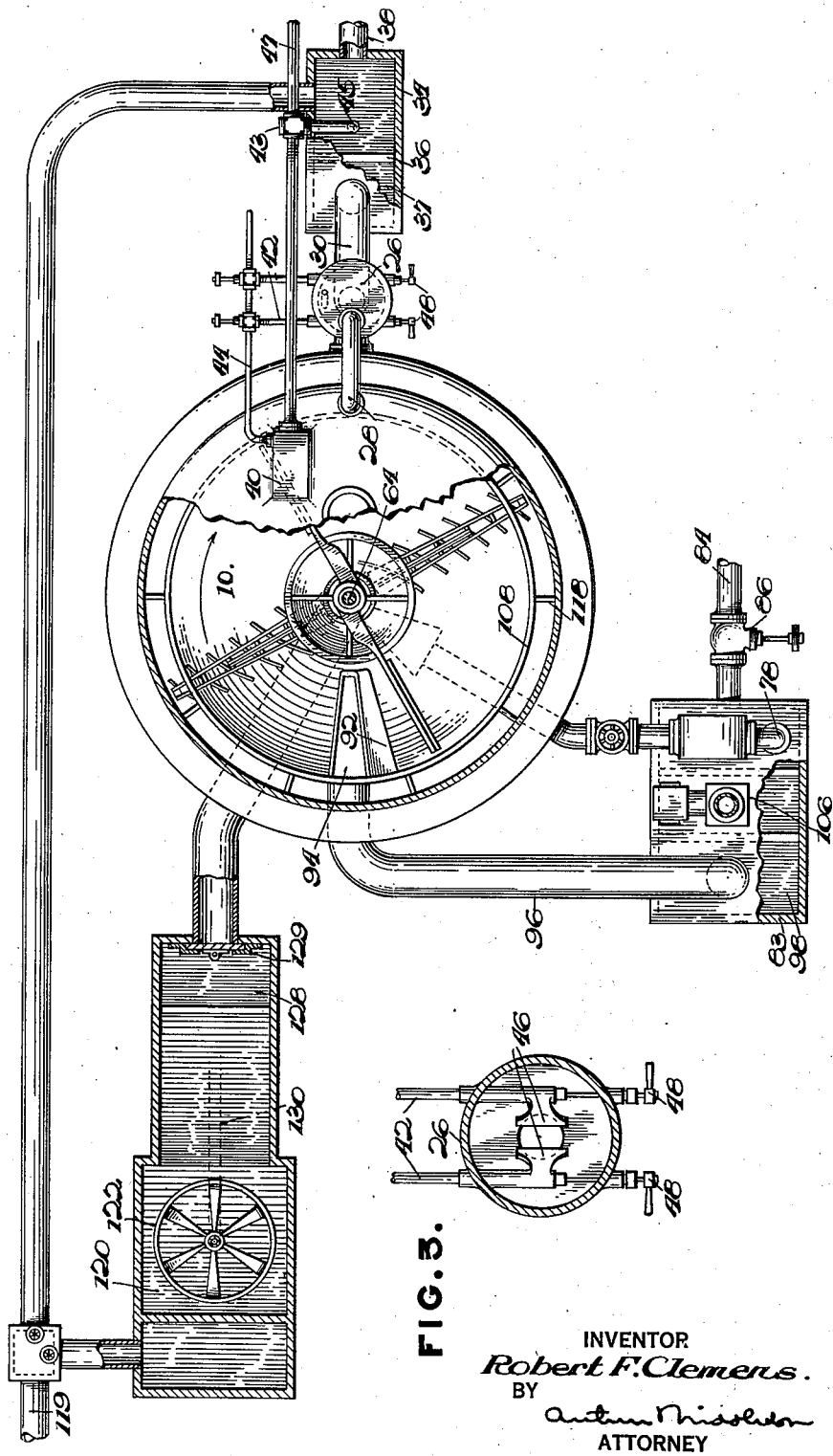
Figure 1 is a top plan view of an apparatus constructed according to the principles of the present invention.

Referring now to the drawings in detail, the main treatment tank is designated in its entirety at 10 and is in the form of a closed structure having a dome-like roof or top 12, provided with a glass sealed inspection opening 13, a bottom 14 which, in the present instance is shown as sloping toward a central sludge sump 16, and a cylindrical side wall 18.

The level of liquid maintained within the tank 10 is determined by means of an upstanding overflow weir 20 which extends around the peripheral regions of the tank adjacent the top thereof and over which clarified effluent is adapted to flow for discharge into a peripheral launder 22. The launder 22, and consequently the main tank 10, communicate by means of a passageway 24 with a chamber or compartment 26 positioned adjacent the main tank structure 10, the latter compartment, together with its associated structure, constituting an arrangement for applying the effect of a vacuum to the main tank and also for controlling the height of liquid in the overflow launder 22 or at least in the discharge regions of the launder. Vacuum applied to the chamber 26 is communicated to the main tank partly through the passageway 24 and partially through a pipe 28 which connects the main tank and compartment through the respective top portions thereof.

An effluent discharge pipe or conduit 30 extends downwardly from the compartment 26 and constitutes a barometric leg in that its lower end is submerged in a pool of liquid 32 maintained in a casing 34 and the level of which is determined by means of an overflow dam 36. A discharge conduit 38 communicates with the interior of the casing 34 and serves to conduct the effluent to discharge.

The vacuum producing means is in the form of a wet vacuum pump 40 for withdrawing air or liquid from the interior of the chamber 26 by means of a pair of pipes 42 which are connected to the pump 40 by means of a manifold connection 44. The pipes 42 terminate at their lower end in a pair of nozzles 46 (see also Figure 3) which may be adjusted as to height by means of hand-operated shafts 48 that extend through the wall of the chamber or compartment 26. The pump is provided with a discharge pipe 41 connected through a three-way valve 43 alternatively to a pipe 45 for discharge into the effluent contained in the casing 34 or to a pipe 47 for discharge at a remote point if further treatment of the discharged gas, vapors or liquid is desired.

A port hole which is closed by means of an inspection glass 50, while a water jet or spray 52 keeps the glass clean, is provided for washing etc. the underneath side of the glass to clear the same of scum and the like. A valve 54 controls the flow of liquid to the spray.

Gas containing liquid suspension or feed liquid to be treated continually enters the main tank 10 through a fixed feed conduit 56 having a vertical portion 57 which passes upwardly centrally into the tank. This conduit 56 constitutes a stationary section of a draft tube and has associated therewith a rotatable draft tube or draft tube section 58 the upper terminal of which is preferably flared outwardly as at 60 and terminates in a region adjacent the surface of the body of liquid being treated. The draft tube section 58 is rotatably supported by means of a spider 62 supported on a shaft 64 passing through the dome-like roof 12 of the tank and which is provided with suitable gas-tight sealing means 66. The shaft 64 is adapted to be rotated by means of a motor M operating through a suitable gear reduction mechanism 68. The elevation of the scum sweeping arms 88, and of the spider 62 and consequently of the upper end of the draft tube section 58 and the parts carried from the latter may be varied by means of an exteriorly located hand-wheel 70 serving as a nut that is operatively associated with a threaded upright section 65 rising from the shaft 64. The gear reducing mechanism 68 embodies as a part thereof a worm gear 69 which is suitably supported from the roof of the tank so as to have horizontal turning movement about a vertically-extending axis. An upwardly extending bracket 67 is carried by this worm gear 69 and thereupon there is mounted the hand-wheel 70 which normally turns with the worm gear 69, but which is mounted so as to be turned by hand relative to the worm gear whereby the shaft 64 through the medium of the threaded upright section 65 thereof can be vertically moved to effect the vertical positioning of the parts carried by said shaft, to wit, the scum skimming arms, the draft tube section 58 and the parts carried by the latter. This vertical movement of the shaft 64 relative to the worm gear 69 is permitted because of a splined driving connection which has been provided between the worm gear 69 and the vertical shaft 64 that extends through and which is axially aligned with the worm gear.

As illustrative of the construction as to how the motor actuated worm gear 69 derives rotatable support from a stationary supporting member such as the top or roof of the tank and as to how the vertically extending shaft 64 is mounted so as to be driven from the worm gear which while at the same time having means associated therewith for effecting vertical adjustment of the shaft relative to the gear, reference is made to the construction shown and described in the Scott Patent No. 2,087,725, granted July 20, 1937, entitled "Sedimentation device."

A plurality of rake arms 72 extend substantially radially outwardly from the draft tube 58 adjacent the bottom of the tank and are supported from and rotatable with the draft tube. The arms 72 carry raking blades or plows 74 which are adapted upon rotation of the arms to rake or impel sludge or sediment settling on the tank floor 14 to the discharge sump 16 from whence it may be conducted to a discharge by means of a conduit 76 and pump 78. The pump 78 is provided with an exhaust conduit 80 that discharges into a sump 82 provided in a casing 83 and having an outlet communicating with a discharge pipe 84 which is controlled by means of a gate valve 86. The sump 82 is isolated from the remainder of the casing 83 by means of a baffle 85.

A plurality of scum-sweeping arms 88 extend radially outwardly from the rotatable shaft 64 and each arm supports a resilient scum-sweeping blade 90 that serves, upon rotation of the arms 88 to sweep scum and other floating material upwardly along an inclined ramp 92 (Figure 1) leading to a scum-receiving hopper or sump 94 which communicates by means of a conduit 96 with a pool 98 maintained in the casing 83 by means of a baffle or dam 100 which is spaced from the baffle 85. The conduit and pool constitute in effect a barometric leg for preventing ingress of air into the tank at this region of scum removal.

The space existing between the baffles 85 and 100 forms an overflow sump 102 from which sludge or sediment that may issue from the sump 82 together with scum overflowing the baffle or dam 100 may be discharged by means of a rising suction pipe 104 and pump 106.

Disposed within the tank 10 and extending therearound in the peripheral regions thereof and spaced inwardly from the outer wall 18 is a liquid-dividing wall or baffle 108 for functionally dividing or separating the liquid contents of the tank into two communicating bodies or columns including a central cylindrical column 110 representing the liquid being treated and an enveloping annular column 112 representing clarified liquid. The lowermost edge of the dividing wall 108 is designated at 114 while the region of communication between the two liquid bodies is designated at 116. Suitable spider members or webs 118 serve to hold the dividing wall 108 in position within the tank.

In case the incoming feed liquid does not already contain sufficient gas to cause its suspended particles to float under the influence of vacuum in the tank 10, as it rarely does, this liquid is passed from a feed pipe 119 through an aerating or gassing station made up of an aerating chamber 120 having an aerating impeller 122 rotatably mounted therein, followed by a de-aerating or degassing chamber 124, from whence the liquid flows over a dam or weir 126 into a well 128 and from thence to the feed pipe or conduit 56, its flow thereinto being controlled by means of a manually adjustable gate member 129. The gaseous medium is supplied to the aerating chamber 120 from a supply pipe 130 having a valve 132 therein for control of the flow of gaseous material.

The apparatus which comprises the present invention has been termed "Vacuator" a trademark name given to and used in connection with various embodiments of the invention prior to filing of this application. In the operation of the Vacuator, liquid suspension to be treated, and which may originally contain sufficient gas to permit flotation of particles under the influence of vacuum or which may be subjected to an initial gassing process in the gassing chamber 120, is continually drawn, due to the vacuum effect upwardly through the draft tube sections 56 and 58 from whence it is emitted through the flared portion 60 into the region of the liquid level of the body of liquid undergoing treatment in the tank 10. This region extends from the plane of emission of the fresh feed liquid from the draft tube section 58 upwardly to the surface level of the tank within the confines of the annular wall 108 and exists within approximately fifteen inches or less below the surface level of the liquid. The partition or wall 108 divides the tank contents into the two liquid bodies or columns 110, 112 of liquid that balance each other. Since the partition terminates well short of the bottom of the tank, the liquid bodies 110 and 112 are free to combine in the space 116 but this space is essentially in a region functionally remote from the point of liquid delivery into the tank.

The effect of vacuum, produced by the dry vacuum pump 40, causes minute bubbles of gas to attach themselves to particles in suspension in the liquid whereupon those particles are caused to float to the liquid surface where they collect as or form into a scum of floated material. This flotation effect takes place not only on normally floatable particles but also on certain normally non-floatable particles. This continually formed scum or "float" of floating or floated particles, is swept around the liquid level by the sweeping blades 90 on the scum arms 88 due to their rotation by means of shaft 64 and its motivating mechanism. The resilient blades 90 sweep scum that they encounter, up the ramp 92 (Figure 1) whereupon scum drops into hopper 94 and flows to discharge through pipe 96 and its barometric leg, without any material air-leakage into the tank taking place through the discharge pipe 91, for otherwise the effect of vacuum in the tank would be lessened thereby. Clarified liquid continually overflows the weir or edge 20 from the top of the column 112 of clarified liquid and passes via launder 22 into the effluent pipe 30 which constitutes a barometric leg to prevent air-leakage. The column 112 of clarified liquid balances the body 110 of liquid being treated, but since this latter column of liquid being treated plus its floating scum is somewhat heavier than the column 112 of clarified liquid, the liquid level of the combined liquid being treated and its scum is somewhat higher than the liquid level of the clarified liquid. However, the weir 20 that determines the liquid level of the clarified liquid column 112 may thus be said to determine the general liquid level of the liquid being treated. The baffle and weir arrangement provides also for efficient feed distribution, causing improved flotation and sedimentation with a minimum of bypassing.

The wall or partition 108 rises high enough above the liquid level of the column 110 to prevent scum from passing thereover into the clarified liquid column 112. It leaves a gas passageway between the area or region immediately over the liquid body 16 and the region immediately over the liquid of column 112. It will be noted that by this general arrangement of feed, scum discharge, and effluent overflow, that the liquid suspension is supplied to the tank in a region that is functionally remote from the effluent overflow, and that the scum is removed from a region also functionally remote from the effluent overflow. Vapors or gas extracted from the liquid pass to the gas space provided in the tank above the liquid level and from whence they migrate to the chamber 26 and are continually sucked off through the vacuum pump 40 to discharge or to further treatment.

Certain solids in certain liquids will not float even under the influence of the effect of vacuum. These tend to descend and ultimately sink onto the tank floor 14 where they accumulate as sediment. This sediment is dischargeable from the tank by means of the rake arms 72 and raking or plowing blades 74 which rotate with the draft-tube section 58. The speed of rotation of these rake arms is so slow as not to roil up the sediment. The sediment is thus impelled into the sludge sump 16 from whence it can be removed by pump 78 for disposal or for further treatment. The discharge of sediment or sludge is optional and depends upon whether or not sediment results from the treament of the particular liquid suspension being acted upon.

In the event of loss of the effect of vacuum within the tank 10, all of the liquid contents thereof will not pass out therefrom in quick order for such outflow will be opposed or prevented due to the structure used. If there be no valve in the feed pipe 56, liquid from the tank will flow back therethrough until the tank liquid assumes a level at an elevation equal to the upper edge of the flared portion 60 of the draft-tube section 58 because from that level downward there is no escape for any liquid from the tank.

If aeration of the liquid feed is resorted to and air is to be the gas used to aerate, aeration can take place in open air, but where the liquid suspension has a high biochemical oxygen demand, a gas should be used that is inert to that demand. If the gas used has a tendency to leave liquid quickly, the gassing should take place in chamber 120 with that chamber covered. After gassing, it is important that there be removed from the liquid large bubbles, for it is only the very fine, the infinitesimal bubbles that are most effective in flotation, as large bubbles indeed interfere with good flotation. Such a large bubble eliminating station is provided in chamber 124, from whence the gassed liquid or liquor passes through the pipe 56 and up the draft-tube 58.

The degree of vacuum to be used has been found satisfactory if it is equal to the order of between seven and nine or nine and a half inches of mercury. In general the more vacuum, the more effective is the separation of suspended particles. Likewise, in general the detention period, based on average flow into the tank, has been found to be of the order of from three to ten minutes. Since it is important that the effluent have a minimum of suspended particles therein, the partition 108 should extend downwardly into the tank to a region where there is a minimum of such particles, and that region has been found to be capable of definition as that at which there is a vacuum effect equal to the order of five inches of mercury. With the stated degree of vacuum used, it is desirable to have the tank of the order of ten feet deep. In such a tank, with such a degree of vacuum used, the partition 108 should terminate about five feet or five and a half feet from the bottom of the tank.

Figure 2:
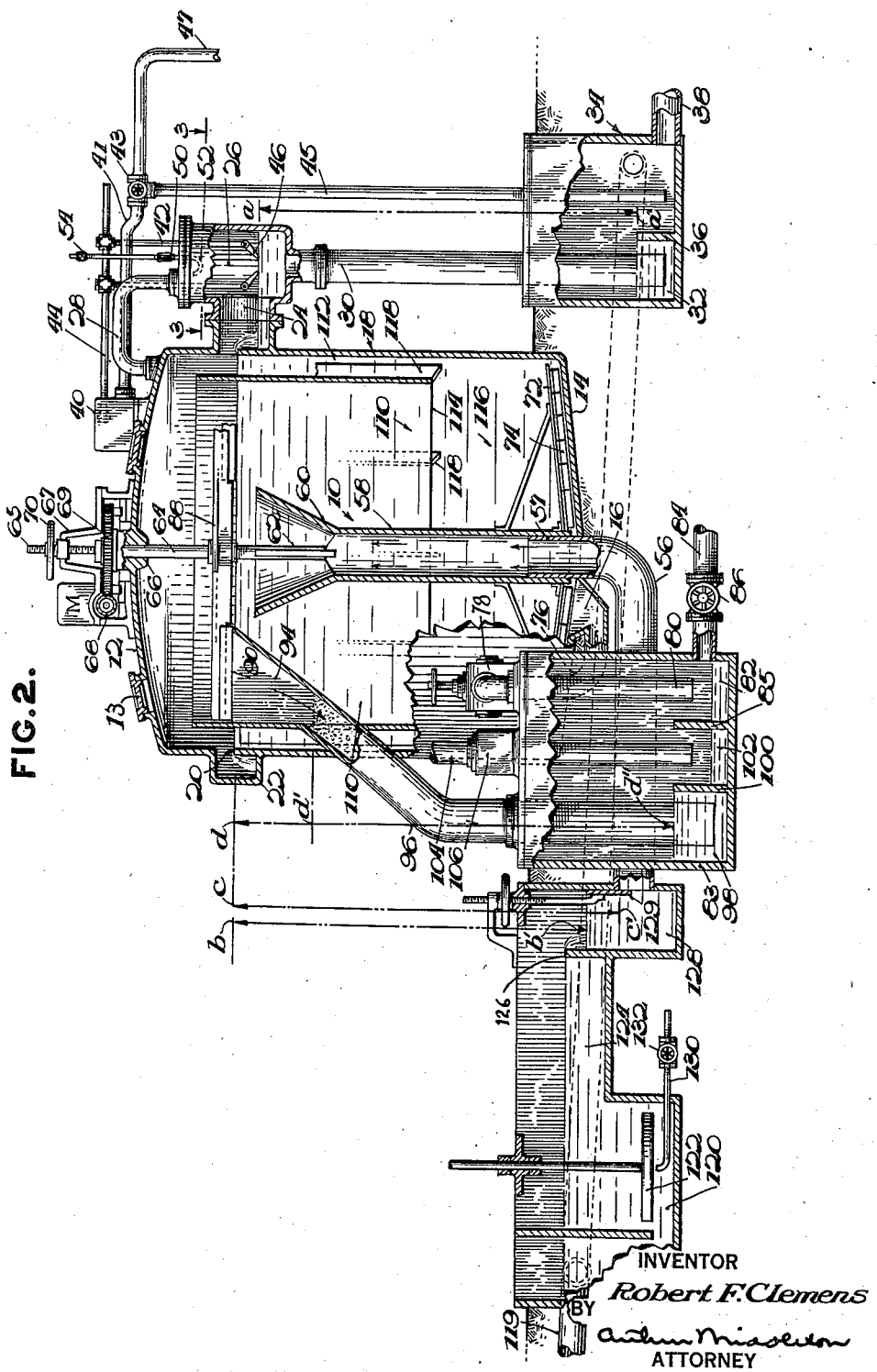
Figure 2 is a vertical sectional view thereof.

Referring now to Figure 2, the liquid level maintained in the overflow launder 22, or at least in the region of the launder adjacent the barometric leg means 30 and as controlled by the elevation assigned to the nozzles 46 is indicated by the dimensioned line $a'—a$. This height $a'—a$ of liquid in the barometric leg arrangement, to wit, the height of the outflow barometric leg, obviously determines the degree of vacuum or subatmospheric pressure that may be maintained in the tank regardless of power developed by the pump provided of course that this pump develops a degree of vacuum at least equal to or above a predetermined minimum. Consider the liquid level of the liquid in the tank as a basic elevation, to wit, a basic elevation determined by overflow weir 20. Then the operative level of the liquid in the well 128 is such that its distance $b'—b$ below the basic elevation is somewhat less than the effective height $a'—a$ of the outflow barometric leg just referred to whereby there will take place or be realized an inflow of liquid through the conduit or inflow barometric leg 56 into the tank and a concurrent outflow of dense liquid from the tank through the downflow barometric leg 30. This is as it should be. For proper operation the distance $b'—b$ must be maintained somewhat less than the distance at $c'—c$ from the inlet opening leading into the conduit 56 for it is necessary that the effect of the vacuum in the tank be not overcome or broken by undue lowering of the liquid seal afforded by the liquid in the well 128. If this liquid seal were not maintained the liquid would not be drawn into and passed upwardly through the conduit or draft tube sections 54 and 56 into the tank. In order that the distance or height $b'—b$ of the inflow barometric leg will be maintained somewhat less than the distance $c'—c$, it will be noted that the distance indicated at $a'—a$ as the height of the outflow barometric leg within the draft tube 30 is deliberately determined and made so that it is somewhat less than that of said distance $c'—c$ whereby the liquid seal for the inlet passage of the feed conduit will be maintained and will not be broken incident to any concomitant flow of liquid into and flow of liquid from the tank. The distance $d''—d'$ between the level of the liquid in pool 98 and the basic elevation as determined by said weir 20 is considerably greater than the height of the outflow barometric leg at 30 as indicated by $a'—a$ since the barometric leg, to wit, the scum barometric leg, afforded in the scum line 96 is made up of scum or at least includes much scum that is relatively light as compared with the dense or heavy fluid in the outflow barometric leg 30. The distance indicated at $d''—d'$ is illustrative of the general position of the scum material in the conduit 96 and ordinarily the level $d'$ thereof will vary because of quantities of scum therein varying relative to quantities of heavier liquid that passes outwardly with the scum. The scum barometric leg because of its including scum—as well as some liquid—takes on and requires substantially greater height therefor than that of said height $a'—a$ of the outflow barometric leg 30.

In connection with the foregoing it may be tersely stated (1) that the fixed feed conduit or tube 56, the intake end of which is constantly submerged, and the associated rotatable draft tube section 58 collectively functions as a single draft tube which provides essential features for that which has been or may be referred to as the intake barometric leg or as the barometric upflow feed leg; (2) that the effluent discharge pipe 30 the lower end of which is constantly in submergence constitutes a heavy liquid discharge conduit or tube providing that which has been or may be referred to as the outflow barometric leg or as the barometric downflow liquid leg; (3) that the structure providing the scum-receiving hopper 94 and the conduit or tube 96 leading downwardly therefrom extends or dips into a constantly maintained well of liquid 98 whereby the lower end thereof is constantly sealed against the entrance of air and this construction is sometimes herein referred to as the scum discharge conduit that provides the barometric scum-discharge leg; and (4) that the main treatment tank 10 has adjacent thereto an auxiliary chamber providing structure 26 of which the upper interior portion thereof is in constant communication with the upper interior portion of the tank whereby the same degree of vacuum or reduced pressure is maintained in the region immediately overlying the liquid in the tank and any overflowed heavy liquid in the outflow launder 22 and the auxiliary chamber 26; and (5) that a wet vacuum pumping means comprising intake nozzles is provided to determine the elevation of the liquid in the auxiliary chamber 26 and that this same feature is relied upon for determining that constant degree of vacuum or reduced pressure which is desired for the particular unit.

Obviously, the degree of vacuum maintained in the tank 10 may be regulated within very close limits by adjusting the position of the suction nozzles 46. Such variation of the position of the nozzles serves to increase or decrease the length of the distance $a—a$ and consequently increase or decrease the hydrostatic head of liquid in the column at 30. In addition to this, the nozzles 46 serve to prevent surging of liquid in the barometric leg at 30 under which circumstances liquid would occasionally back up, so to speak, in the column and destroy the function of the balanced liquid bodies 110 and 112 as well as to raise the overall liquid level in the tank and flood the apparatus.

It has been found that such a Vacuator can treat liquid suspensions continuously at an overflow rate of clarified effluent equal to at least from 5,000 to 10,000 gallons per twenty-four hours per square foot of liquid level surface of the liquid being treated. The rate may be less than 5,000 and more than 10,000 gallons for it depends upon the degree of clarity of effluent required, or the degree to which solids that are required to be removed therefrom. As much as 60 to 80% of the suspended particles of the liquid being treated can be removed as scum or float. Most liquids should be aerated or gassed prior to their introduction into the tank, and the air or gas requirements thereof are of the order of from 0.02 to 0.05 cubic feet per gallon. The detention period of the liquid undergoing gas-diffusing therein, is satisfactory when of the order of five minutes, based upon average flow, depending upon the character of aeration used and also upon the degree of clarification required. The detention period of the liquid in the vacuum-flotation tank is satisfactory when of the order of from three to ten minutes, based upon average flow and also depending upon the degree of clarification required. If the liquid being treated has a relatively high biochemical oxygen demand (B. O. D.), the gas used for diffusing in the liquid instead of air may well be some gas that is inert to the liquid's oxygen demand, such as nitrogen, carbon dioxide, and so on, or combinations thereof. However, some liquids do not need to be gassed because they already contain enough gas to bring about flotation of their suspended particles when under the effect of vacuum. Such a liquid may be sewage that has gone septic, or activated sludge, or any other well-aerated liquid.

Most flotation processes require frothing agents and depressant agents or reagents to be added to the liquid suspension to be treated, but such chemicals or their equivalents do not appear necessary when treating in Vacuator liquids that contain septical organics, oils or greases.

Heretofore, clarifiers which are sedimentation tanks, have been used primarily to separate from liquid suspensions those solids that were normally settleable. Solids that were normally floatable would rise to the surface and form a floating scum, which the clarifier cannot always handle as well as might be desired. A Vacuator removes finely suspended matter by flotation rather than by sedimentation. Thus a Vacuator operates on an opposite theory for it is designed primarily to separate from liquid suspensions not only normally floatable particles but certain normally non-floatable particles which under the effect of the Vacuator are rendered floatable. In a clarifier suspended solids of certain critical sized solids will either settle or float extremely slowly whereas the Vacuator causes them to float rapidly. A Vacuator requires less ground space, and gives off no odors since it comprises a sealed tank. Since it comprises a sealed tank, the unsightly scum is not apparent to observers or visitors to a treatment plant that uses it. A Vacuator is a beneficiator of as well as a remover of solids for this type of vacuum flotation apparatus, has the property of rendering those solids that it does not float, into a condition by which their settleability is improved when subjected to treatment in a subsequent clarifier or other sedimentation apparatus.

What is claimed is:

1. Apparatus for separating suspended particles from liquids, comprising a closed tank for holding within the upper portion thereof a gas at sub-atmospheric pressure and within the lower portion thereof an ever-changing body of liquid undergoing treatment while constantly exposed to said overlying gas; a liquid-sealed upflow feed tube terminating within the tank; clarified-liquid discharge means embodying an upflow section leading from the lower portion of the tank, an overflow weir which determines the general level of liquid undergoing treatment in the tank, a liquid-sealed barometric leg for the downward passage of liquid overflowing said weir in constant gas communication with the gas within the upper portion of the tank, liquid-sealed discharge means disposed for receiving floated scum from the body of liquid undergoing treatment within the tank; pumping means for sucking gas from said apparatus having a suction intake above the overflowed effluent from said weir disposed on the delivery side of said weir with the intake end thereof at elevation lower than said weir whereby reduction of gas pressure within the tank can be maintained but not to a degree sufficient to cause the overflowed liquid to rise to elevation as high as that of the overflow weir.

2. Apparatus for separating suspended particles from liquids, comprising a closed tank for holding an ever-changing body of such liquid and a contacting body of gas thereabove, a liquid-sealed upflow feed-tube terminating adjacent the liquid level in the tank, an overflow weir for determining the general liquid level of liquid under treatment in the tank, a partially submerged baffle in the tank under which liquid must flow to pass over the weir, a launder for receiving liquid overflowing the weir, a liquid-sealed barometric leg above which the gas of the tank also extends for maintaining therein a discharging column of liquid which has overflowed the weir and has been received by the column from the launder, liquid-sealed means for removing floating scum from the feed side of the baffle, and means for applying suction to maintain sub-atmospheric pressure on the gas overlying the liquid in both the tank and the discharging column which includes a suction intake suitable for sucking liquid when submerged and gas when not submerged disposed outside the weir at an elevation lower than the weir but so related to the liquid of the barometric leg that if submerged by discharging liquid of the column rising thereto due to excessive sub-atmospheric pressure the intake will suck such liquid to removal from the column and the tank before such rising liquid reaches the level of the weir.

ROBERT F. CLEMENS.